United States Patent
Athley et al.

(10) Patent No.: US 10,886,986 B2
(45) Date of Patent: Jan. 5, 2021

(54) ESTIMATION OF CHANNEL CONDITIONS

(71) Applicant: Telefonaktiebolaget LM Ericsson (publ), Stockholm (SE)

(72) Inventors: Fredrik Athley, Kullavik (SE); Andreas Nilsson, Gothenburg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/592,412

(22) Filed: Oct. 3, 2019

(65) Prior Publication Data

US 2020/0036423 A1 Jan. 30, 2020

Related U.S. Application Data

(63) Continuation of application No. 15/537,030, filed as application No. PCT/EP2017/062343 on May 23, 2017, now Pat. No. 10,447,365.

(51) Int. Cl.
*H04B 7/06* (2006.01)
*H04B 7/0456* (2017.01)
(Continued)

(52) U.S. Cl.
CPC ......... *H04B 7/0617* (2013.01); *H04B 7/0417* (2013.01); *H04B 7/0469* (2013.01);
(Continued)

(58) Field of Classification Search
CPC .... H04B 7/0617; H04B 7/088; H04B 7/0469; H04B 7/0634; H04B 7/0626;
(Continued)

(56) References Cited

U.S. PATENT DOCUMENTS 5,671,168 A 9/1997 Liu et al.
9,220,026 B2 12/2015 Hasegawa
(Continued)

FOREIGN PATENT DOCUMENTS

EP 3 035 620 A1 6/2016
WO 2018/121843 A1 7/2018

OTHER PUBLICATIONS

International Search Report and Written Opinion issued in International Application No. PCT/EP2017/062343, dated Jan. 22, 2018, 13 pages.

*Primary Examiner* — Kenneth T Lam
(74) *Attorney, Agent, or Firm* — Rothwell, Figg, Ernst & Manbeck, P.C.

(57) ABSTRACT

There is provided mechanisms for obtaining channel conditions per antenna element of an antenna array comprising N antenna elements. The antenna array is configured for communications using orthogonal sub-carriers. A method is performed by a radio transceiver device. The method comprises obtaining channel conditions of a radio propagation channel per sub-carrier for signals received on the sub-carriers by the antenna array. A set of receiving entities are associated with the sub-carriers in an interleaved manner such that each receiving entity is interleaved over a respective disjoint subset of sub-carriers. The method comprises transforming the channel conditions at least for those sub-carriers located within a coherence bandwidth of the radio propagation channel to channel conditions for the N antenna elements by using a relation that maps the receiving entities to the N antenna elements.

20 Claims, 4 Drawing Sheets

(51) Int. Cl.
  *H04B 7/08* (2006.01)
  *H04B 7/0417* (2017.01)
  *H04L 25/02* (2006.01)
  *H04L 5/00* (2006.01)

(52) U.S. Cl.
  CPC ......... *H04B 7/0626* (2013.01); *H04B 7/0634* (2013.01); *H04B 7/088* (2013.01); *H04L 25/0202* (2013.01); *H04B 7/0695* (2013.01); *H04L 5/0048* (2013.01); *H04L 25/0206* (2013.01)

(58) Field of Classification Search
  CPC . H04B 7/0417; H04B 7/0695; H04L 25/0202; H04L 25/0206; H04L 5/0048
  See application file for complete search history.

(56) References Cited

U.S. PATENT DOCUMENTS

| | | | |
|---|---|---|---|
| 9,853,702 B1 | 12/2017 | Liang et al. | |
| 10,447,365 B2* | 10/2019 | Athley | H04B 7/0634 |
| 2005/0287978 A1* | 12/2005 | Maltsev | H04B 7/0634 |
| | | | 455/403 |
| 2009/0285325 A1 | 11/2009 | Zhou | |
| 2010/0087151 A1 | 4/2010 | Auer | |
| 2012/0288022 A1 | 11/2012 | Guey et al. | |
| 2015/0098444 A1 | 4/2015 | Marzetta et al. | |
| 2016/0080061 A1 | 3/2016 | Yang et al. | |
| 2016/0119910 A1* | 4/2016 | Krzymien | H04W 72/046 |
| | | | 370/329 |
| 2017/0272223 A1 | 9/2017 | Kim et al. | |
| 2017/0288831 A1* | 10/2017 | Cezanne | H04W 72/005 |

* cited by examiner

ESTIMATION OF CHANNEL CONDITIONS

CROSS REFERENCE TO RELATED APPLICATIONS

This application is a continuation of U.S. patent application Ser. No. 15/537,030, having a section 371 date of Jun. 16, 2017 (published as US 20180343044 on Nov. 29, 2018), which is the 35 U.S.C. § 371 National Stage of international patent application no. PCT/EP2017/062343, filed May 23, 2017. The above identified applications and publication are incorporated by this reference.

TECHNICAL FIELD

Embodiments presented herein relate to a method, a radio transceiver device, a computer program, and a computer program product for obtaining channel conditions per antenna element.

BACKGROUND

In communications networks, there may be a challenge to obtain good performance and capacity for a given communications protocol, its parameters and the physical environment in which the communications network is deployed.

For example, the so-called new radio (NR) access technology being considered for fifth generation (5G) telecommunications system could utilize so-called massive multiple-input multiple output (MIMO) systems for transmission and reception. To reach the full potential of massive MIMO, full control of amplitude and phase of each antenna element of the transmitters and receivers in the communications system could be needed.

Furthermore, channel state information could be needed at the transmitter to be able to set the amplitude and phase per antenna element in an optimal way. Therefore, there could be a need to utilize channel reciprocity since the signaling overhead to estimate the radio propagation channel between a large number of antenna element pairs (one at the transmitter and the other at the receiver) by means of feedback could be overwhelming.

When per-antenna element channel estimates are available at the transmitter, precoding mechanisms for both single- and multi-user MIMO can be used. For example, in a rich scattering radio propagation channel where conventional beamforming gives little or no array gain, maximum ratio transmission (MRT) can in theory give full array gain by focusing energy to a single point in space rather than in a single direction. Moreover, spatial nulling towards co-scheduled users when using multi-user MIMO transmission can be used to mitigate inter-user interference.

The antenna elements in both the transmitter and the receiver are part of antenna arrays. Existing antenna arrays comprising comparatively many antenna elements are commonly based on analog or hybrid analog/digital beamforming architectures. This has been motivated by the high cost, complexity and power consumption that have been associated with a fully digital architecture. However, recent advances in digital technology have made a fully digital implementation a viable, or sometimes even preferred, architecture for the antenna arrays.

Even though a fully digital antenna array with digital control of each individual antenna element and arranged for massive MIMO transmission and reception is realistic to implement in a cost-effective way, the comparatively large amount of data massive MIMO transmission and reception generate poses challenges, both in terms of digital processing capacity and data interface requirements.

Therefore, it is currently not realistic to assume that a full digital baseband chain will be connected to each individual antenna element. It is therefore envisioned that data reduction could be performed before the data from the antenna array is processed at baseband. One way to achieve this is to apply a beam space transformation and then select a few beams to be further processed at baseband. One issue with such a beam space data reduction is that it is no longer possible to obtain channel estimates per antenna element since data for only a few beams are available at baseband.

Hence, there is still a need for improved channel estimation.

SUMMARY

An object of embodiments herein is to obtain channel conditions per antenna element that enables improved channel estimation.

According to a first aspect there is presented a method for obtaining channel conditions per antenna element of an antenna array comprising N antenna elements. The antenna array is configured for communications using orthogonal sub-carriers. The method is performed by a radio transceiver device. The method comprises obtaining channel conditions of a radio propagation channel per sub-carrier for signals received on the sub-carriers by the antenna array. A set of receiving entities are associated with the sub-carriers in an interleaved manner such that each receiving entity is interleaved over a respective disjoint subset of sub-carriers. The method comprises transforming the channel conditions at least for those sub-carriers located within a coherence bandwidth of the radio propagation channel to channel conditions for the N antenna elements by using a relation that maps the receiving entities to the N antenna elements.

According to a second aspect there is presented a radio transceiver device for obtaining channel conditions per antenna element of an antenna array comprising N antenna elements. The antenna array is configured for communications using orthogonal sub-carriers. The radio transceiver device comprises processing circuitry. The processing circuitry is configured to cause the radio transceiver device to obtain channel conditions of a radio propagation channel per sub-carrier for signals received on the sub-carriers by the antenna array. A set of receiving entities are associated with the sub-carriers in an interleaved manner such that each receiving entity is interleaved over a respective disjoint subset of sub-carriers. The processing circuitry is configured to cause the radio transceiver device to transform the channel conditions at least for those sub-carriers located within a coherence bandwidth of the radio propagation channel to channel conditions for the N antenna elements by using a relation that maps the receiving entities to the N antenna elements.

According to a third aspect there is presented a radio transceiver device for obtaining channel conditions per antenna element of an antenna array comprising N antenna elements. The antenna array is configured for communications using orthogonal sub-carriers. The radio transceiver device comprises processing circuitry and a storage medium. The storage medium stores instructions that, when executed by the processing circuitry, cause the radio transceiver device to perform operations, or steps. The operations, or steps, cause the radio transceiver device to obtain channel conditions of a radio propagation channel per sub-carrier for signals received on the sub-carriers by the antenna array. A set of receiving entities are associated with the sub-carriers in an interleaved manner such that each receiving entity is interleaved over a respective disjoint subset of sub-carriers. The operations, or steps, cause the radio transceiver device to transform the channel conditions at least for those sub-carriers located within a coherence bandwidth of the radio propagation channel to channel conditions for the N antenna elements by using a relation that maps the receiving entities to the N antenna elements.

According to a fourth aspect there is presented a radio transceiver device for obtaining channel conditions per antenna element of an antenna array comprising N antenna elements. The antenna array is configured for communications using orthogonal sub-carriers. The radio transceiver device comprises an obtain module configured to obtain channel conditions of a radio propagation channel per sub-carrier for signals received on the sub-carriers by the antenna array. A set of receiving entities are associated with the sub-carriers in an interleaved manner such that each receiving entity is interleaved over a respective disjoint subset of sub-carriers. The radio transceiver device comprises a transform module configured to transform the channel conditions at least for those sub-carriers located within a coherence bandwidth of the radio propagation channel to channel conditions for the N antenna elements by using a relation that maps the receiving entities to the N antenna elements.

According to a fifth aspect there is presented a computer program for obtaining channel conditions per antenna element, the computer program comprising computer program code which, when run on a radio transceiver device, causes the radio transceiver device to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

Advantageously this method, these radio transceiver devices, this computer program and this computer program product enable channel conditions to be obtained per antenna element in an efficient manner, thus enabling improved channel estimation.

Advantageously, the channel conditions could be obtained using a receiver having single baseband chain coupled to the antenna array and using only a single orthogonal frequency-division multiplexing (OFDM) symbol.

It is to be noted that any feature of the first, second, third, fourth, fifth and sixth aspects may be applied to any other aspect, wherever appropriate. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
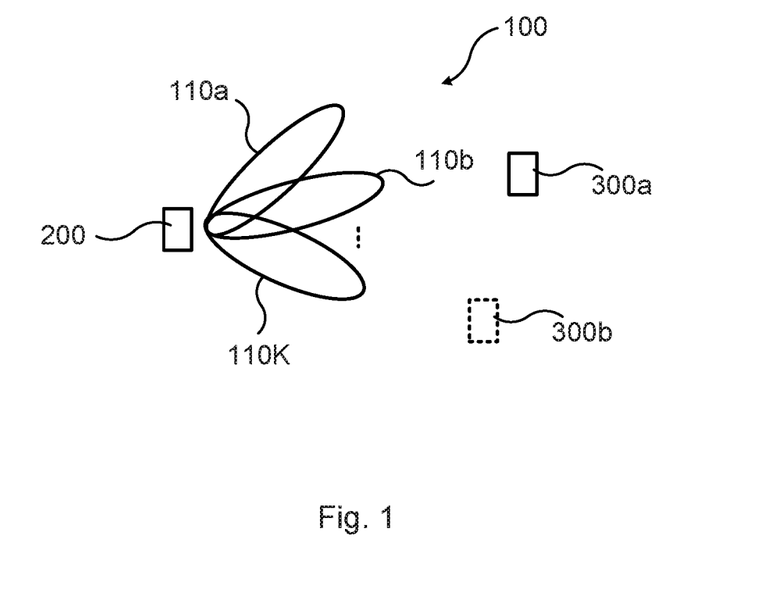
FIG. 1 is a schematic diagram illustrating a communication network according to embodiments.

FIG. 1 is a schematic diagram illustrating a communications network 100 comprising a radio transceiver device 200 acting as an access node providing network access to radio transceiver device 300a acting as a terminal device, and, optionally, at least one further radio transceiver device 300b. The radio transceiver device 200 is assumed to comprise at least one receiver chain and is configured to receive signals from the radio transceiver device 300a in K beams 110a, 110b, ..., 110K. The radio transceiver device 200 is thus configured to communicate in K beams 110a, 110b, ..., 110K (in contrast to omnidirectional beams). It is here noted that the K beams 110a, 110b, ..., 110K mainly are used for channel estimation purposes, such as for obtaining channel conditions.

The access node could be any of a radio access network node, radio base station, base transceiver station, node B, evolved node B, gigabit node B, or access point. The terminal device could be any of a wireless device, mobile station, mobile phone, handset, wireless local loop phone, user equipment (UE), smartphone, laptop computer, tablet computer, wireless sensor, or another radio access network node e.g. for providing wireless backhaul.

Figure 8:
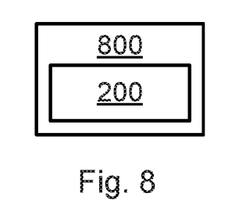
FIG. 8 is a schematic diagram of a radio access network node comprising a radio transceiver device according to an embodiment.
Figure 9:
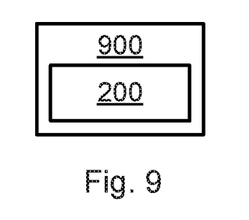
FIG. 9 is a schematic diagram of a terminal device comprising a radio transceiver device according to an embodiment.

Further, although the radio transceiver device 200 is described as an access node, the functionality of the radio transceiver device 200 could be equally well implemented in a terminal device. This is further disclosed below with references to FIGS. 8 and 9.

As disclosed above one issue is the difficulty to obtain channel estimates per antenna element of an antenna array. The antenna array could be part of the radio transceiver device 200.

The embodiments disclosed herein therefore relate to mechanisms for obtaining channel conditions per antenna element of an antenna array comprising N antenna elements 222 and being configured for communications using orthogonal sub-carriers. In order to obtain such mechanisms there is provided a radio transceiver device 200, a method performed by the radio transceiver device 200, a computer program product comprising code, for example in the form of a computer program, that when run on a radio transceiver device 200, causes the radio transceiver device 200 to perform the method.

Figure 2:
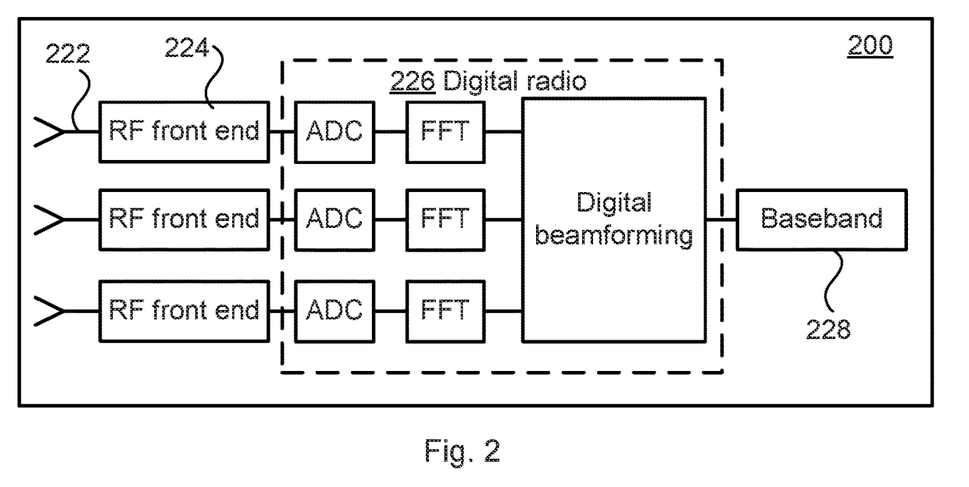
FIG. 2 schematically illustrates an example receiver architecture of a radio transceiver device according to an embodiment.

FIG. 2 schematically illustrates an example receiver architecture of the radio transceiver device 200 (thus assuming that the antenna array could be part of the radio transceiver device 200). The antenna array comprises antenna elements 222 operatively connected via respective radio frequency (RF) front ends and a single digital radio 226 (comprising analog to digital converters (ADC), fast Fourier transformers (FFT) and a digital beamformer) to a single full baseband chain 228. The herein disclosed embodiments can be generalized to multiple baseband chains.

Figure 3:
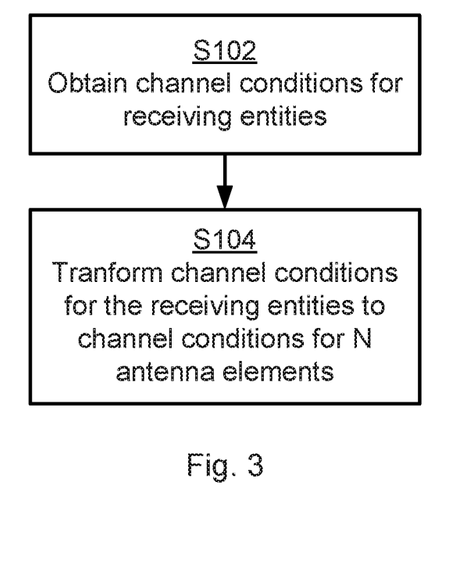
FIGS. 3 and 5 are flowcharts of methods according to embodiments.
Figure 5:
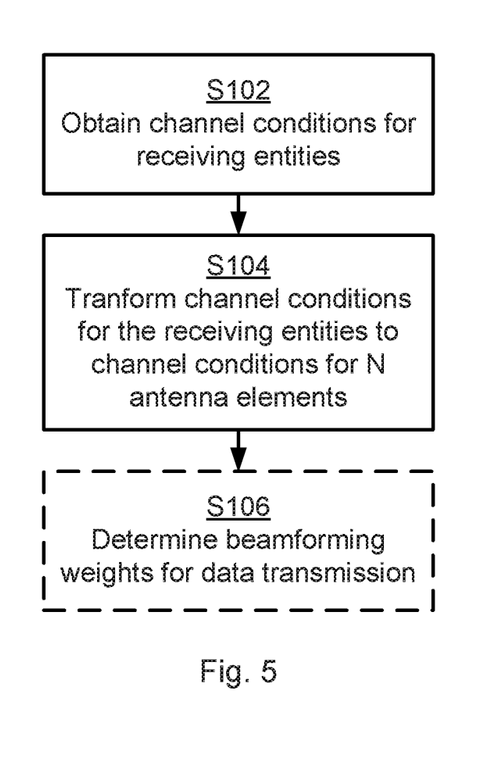

FIGS. 3 and 5 are flowcharts illustrating embodiments of methods for obtaining channel conditions per antenna element. The methods are performed by the radio transceiver device 200. The methods are advantageously provided as computer programs 1020.

Reference is now made to FIG. 3 illustrating a method for obtaining channel conditions per antenna element as performed by the radio transceiver device 200 according to an embodiment. As noted above the antenna array comprises N antenna elements 222 and is configured for communications using orthogonal sub-carriers.

S102: The radio transceiver device 200 obtains channel conditions of a radio propagation channel per sub-carrier for signals received on the sub-carriers by the antenna array. A set of receiving entities are associated with the sub-carriers in an interleaved manner such that each receiving entity is interleaved over a respective disjoint subset of sub-carriers. Examples of such receiving entities will be provided below. Although the channel conditions are obtained per sub-carrier this does not necessarily imply that the channel conditions are obtained for all sub-carriers, just that the channel conditions are obtained per sub-carrier for those of the sub-carriers the channel conditions are obtained. Hence, the channel conditions could be obtained for less than all sub-carriers or for all sub-carriers.

S104: The radio transceiver device 200 transforms the channel conditions at least for those sub-carriers located within a coherence bandwidth of the radio propagation channel to channel conditions for the N antenna elements 222 by using a relation that maps the receiving entities to the N antenna elements 222. Examples of this relation will be provided below.

The herein disclosed embodiments enable per-antenna channel estimation with only a few, or even a single, full baseband chain.

In some aspects the sub-carriers are sub-carriers as used in an OFDM system and the channel conditions are thus obtained per antenna element 222 in an OFDM system.

Figure 4:
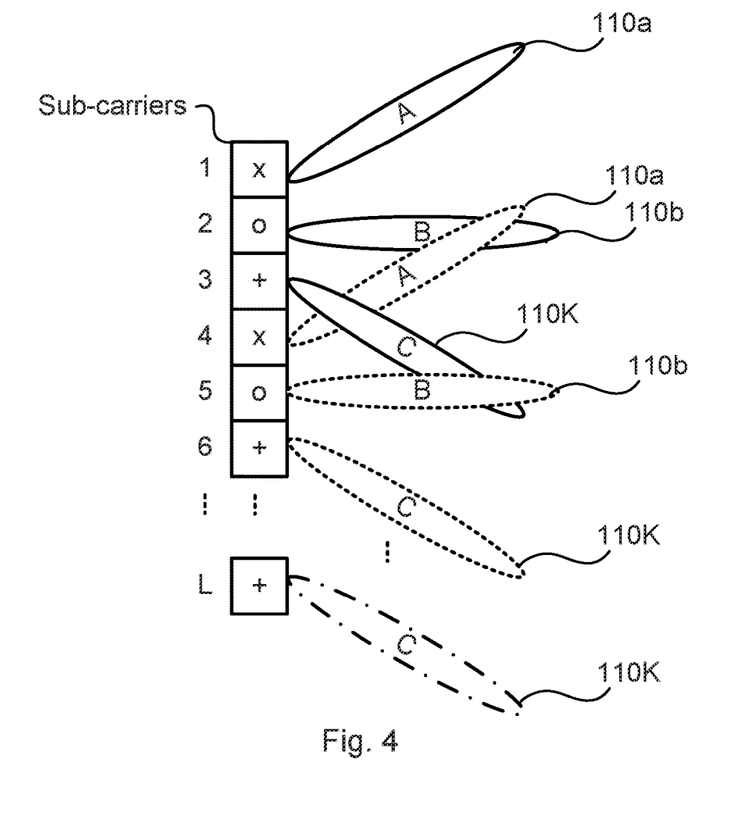
FIG. 4 schematically illustrates an association between receiving entities and the sub-carriers according to an embodiment.

FIG. 4 schematically illustrates an example of how to associate the receiving entities with the sub-carriers in an interleaved manner such that each receiving entity is interleaved over a respective disjoint subset of sub-carriers. In the illustrative example of FIG. 4 the receiving entities are illustrated in terms of the beams 110a-110K as associated with L sub-carriers in total.

As disclosed above, K is the number of beams and therefore the number of sub-carriers that one set of the K beams occupy. However, the communication bandwidth is typically much larger than K sub-carriers (in the illustrative example of FIG. 4 there are L sub-carriers, and typically L>K) so the mapping of K beams to K sub-carriers is repeated manner so as to fill the entire communication bandwidth (or at least the bandwidth for which the channel conditions for the N antenna elements 222 are to be obtained).

For simplicity, the beams representing the receiving entities are denoted "A", "B", "C", and are associated with sub-carriers denoted "x", "o", "+". Sub-carriers denoted "x", "o", "+" form disjoint subsets of sub-carriers. That is, in the illustrative example of FIG. 4 sub-carriers 1, 4, . . . form a first subset, sub-carriers 2, 5, . . . form a second subset, and sub-carriers 3, 6, . . . , L form a third subset, where the first subset, the second subset, and the third subset are disjoint with respect to each other. Beamforming weights for beam "A" are thus applied on every third sub-carrier (carrying a pilot), the ones marked with "x" in FIG. 4. Beamforming weights for beam "B" are applied on every third sub-carrier marked with "o", and so on.

However, although the beams in FIG. 4 denoted "A", "B", "C" are associated with the sub-carriers in a repetitive manner "A"-1, "B"-2, "C"-3, "A"-4, "B"-5, "C"-6, . . . , "C"-L this does not exclude that the receiving entities are associated with the sub-carriers in another interleaved manner, for example allowing permutations. That is, the beams could be associated with the sub-carriers in a non-repetitive manner "A"-1, "B"-2, "C"-3, "B"-4, "C"-5, "A"-6, . . . etc. as long as each receiving entity is interleaved over a respective disjoint subset of sub-carriers.

Embodiments relating to further details of obtaining channel conditions per antenna element as performed by the radio transceiver device 200 will now be disclosed.

According to an embodiment the channel conditions of the radio propagation channel per sub-carrier are obtained at baseband.

According to an embodiment the receiving entities are only associated with those of the sub-carriers that carry pilot signals.

Further, if the channel coherence bandwidth is larger than the bandwidth occupied by K sub-carriers, where K is the number of receiving entities, it can be assumed that the channel estimate for beam "A" at sub-carrier "x" is an accurate estimate also for beam "A" at sub-carriers "o" and "+" (see FIG. 4). This means that no information about the radio propagation channel is lost by interleaving different beams over sub-carriers. Thus, in some aspects the receiving entities are interleaved over the sub-carriers such that all receiving entities are represented within the coherence bandwidth. That is, according to an embodiment the receiving entities are interleaved over the sub-carriers such that all the receiving entities are associated with those sub-carriers located within the coherence bandwidth.

For small coherence bandwidth some interpolation between occupied sub-carriers can be used to obtain channel conditions for all sub-carriers. Hence, according to an embodiment the channel conditions are interpolated between at least two of the sub-carriers in order to obtain channel conditions for all the sub-carriers.

In some aspects the channel conditions are obtained for a single OFDM symbol. That is, according to an embodiment the channel conditions for the N antenna elements 222 are obtained using a single OFDM symbol.

However, it could be that the channel coherence bandwidth is smaller than the bandwidth occupied by K sub-carriers. If the channel coherence bandwidth is smaller than the bandwidth occupied by K sub-carriers, the K receiving entities could be distributed also over the time domain, e.g., by having a first set of K/2 receiving entities in a first OFDM symbol and a second set of K/2 receiving entities in a second OFDM symbol. This is a viable approach if the channel coherence time is larger than the time span over which the K receiving entities have been distributed. That is, according to an embodiment the channel conditions for the N antenna elements 222 are obtained using at least two OFDM symbols, where channel conditions for different receiving entities are obtained for each OFDM symbol.

As mentioned above, there could be different types of receiving entities. Two examples of receiving entities are the beams 110a-110K and the antenna elements 222 themselves.

That is, according to an embodiment the receiving entities are beams 110a-110K generated by the antenna array.

Embodiments applicable to receiving entities being beams 110a-110K will be disclosed next.

In some aspects there are at least as many beams 110a-110K as antenna elements 222.

When the receiving entities are beams 110a-110K, the beams 110a-110K are thus associated with the sub-carriers such that the channel conditions are obtained per beam 110a-110K.

According to an embodiment the beams 110a-110K are generated by digital beamforming, such as in the digital beamformer of the digital radio 226, of the antenna array.

In some aspects the digital radio 226 is capable of frequency-selective digital beamforming so that it can apply beamforming weights individually on each sub-carrier in an OFDM system. Hence, according to an embodiment the digital beamforming is frequency-selective.

In some aspects the digital beamforming is accomplished by using a transform from antenna space to beam space, and where the relation that maps the entities to the N antenna elements 222 is the inverse of this transform. Per-antenna element channel conditions could thus be obtained by inverting digital beamforming transformation as performed in the digital radio 226. That is, according to an embodiment the N antenna elements 222 are represented in antenna space and the beams are represented in beam space, the digital beamforming comprises using a transform from the antenna space to the beams space, and the relation that maps the receiving entities to the N antenna elements 222 is an inverse of this transform.

I some aspects the transformation is a full rank digital beamforming transformation. That is, according to an embodiment the transform represents beamforming weights, and the transform is a full-rank transformation.

Further, according to an embodiment the transform is defined by at least one beamforming matrix comprising the beamforming weights as vectors (below denoted beamforming weight vectors), and the at least one beamforming matrix is a unitary matrix. Each such beamforming matrix could be applied to a group of sub-carriers. That is, according to an embodiment the at least one beamforming matrix is applied to a group of the sub-carriers. Over the entire bandwidth a block-diagonal matrix can then be formed having these beamforming matrices on the diagonal. The transform could thus be defined by a block-diagonal matrix having at least one instance of the at least one beamforming matrix on its diagonal.

In some aspects the transform is accomplished by using beamforming weights and the relation is defined by a pseudo-inverse of the beamforming weights. That is, according to an embodiment the transform represents beamforming weights, and wherein said inverse of said transform is a pseudo-inverse of the beamforming weights.

As an example, the beamforming weight vectors, $w_k$, are collected in a matrix denoted W according to $$W = [w_1 w_2 \ldots ],$$

where $w_k$ is the beamforming weight vector for beam k. In some aspects the matrix W is unitary (such that $W W^H = I$, where I represents the identity matrix and $W^H$ denoted the Hermitian transpose of the matrix W). In view of the above, the matrix W applies to a group of K sub-carriers. When the matrix W is unitary K=N. As an example the matrix W could comprise beamforming weight vectors defined by the discrete Fourier transform (DFT) and hence be a so-called DFT matrix. The mapping for the entire communication bandwidth then consists of a number of such matrices W, which could be collected in a block-diagonal matrix with matrices W on its diagonal.

The channel in beam k is related to the radio propagation channel in element space by:

$$c_{b,k} = w_k^H c_{el},$$

where $c_{el}$ is the K-by-1 vector of channel conditions in antenna element space, and where the subscript index b denotes beam space. It is further assumed that N=K. Assuming W is composed of K orthogonal, unit norm, beamforming weight vectors the inverse of W is simply given by $W^H$. Therefore, the channel conditions in element space are given by:

$$\hat{c}_{el} = W \hat{c}_b,$$

where $$\hat{c}_b = \begin{bmatrix} \hat{c}_{b,1} \\ \hat{c}_{b,2} \\ \vdots \end{bmatrix}$$

is the vector of channel conditions in beam space. This procedure describes how to obtain channel conditions for a block of K sub-carriers. This procedure can thus be performed for each block of sub-carriers to obtain estimates of the channel conditions in antenna element space for the entire communication bandwidth.

As disclosed above, one example of receiving entities is the antenna elements 222 themselves. That is, according to an embodiment the receiving entities are the antenna elements 222 themselves.

Embodiments applicable to receiving entities being the antenna elements 222 will be disclosed next.

In view of the above, antenna elements 222 could, instead of beams 110a-110K, be interleaved over different sub-carriers. The weight vectors, $w_k$, could then be selection vectors that select a single antenna element per sub-carrier. The selection vectors could then be collected in a selection matrix that maps the antenna elements to the sub-carriers. Particularly, according to an embodiment the relation that maps the receiving entities to the N antenna elements 222 is a selection matrix comprising selection vectors, and each selection vector maps a single antenna element 222 to each of the sub-carriers. For example, each selection vector could be an all-zero vectors where the zero "0" at the place of the selected antenna element is replaced by a single one "1", such as a selection vector equal to [0 1 0] if the second out of three antenna elements is selected.

In the most simple case, the selection matrix per N sub-carriers is the N-by-N (or K-by-K since K=N) identity matrix over N sub-carriers. Over the entire bandwidth the selection matrix is then a block-diagonal matrix with these identity matrices on the diagonal. That is, according to an embodiment the total selection matrix over all sub-carriers is a block-diagonal matrix. Each antenna element could then be selected cyclically over the system bandwidth.

Further aspects applicable to any of the above embodiments will now be disclosed.

There could be different examples of channel conditions obtained in step S102.

In some aspects the channel conditions are channel estimates. That is, according to an embodiment the channel conditions for the N antenna elements 222 are channel conditions of the radio propagation channel.

In some aspects the channel conditions are indicative of interference. That is, according to an embodiment the radio transceiver device 200 is an access node serving a radio transceiver device 300a and the channel conditions are indicative of the signals as received from the radio transceiver device 300a as well as interfering signals received from at least one other radio transceiver device 300b.

In some aspects the channel conditions are indicative of a relation between signal, noise, and interference, and/or throughput. That is, according to an embodiment the channel conditions for the N antenna elements 222 are indicative of signal to interference plus noise ratio (SINR) of the received signals and/or channel throughput of the radio propagation channel.

In some aspects the channel conditions are averaged over time and/or frequency. That is, according to an embodiment the channel conditions are representative of channel estimations as averaged over multiple time and/or frequency samples.

Reference is now made to FIG. 5 illustrating methods for obtaining channel conditions per antenna element as performed by the radio transceiver device 200 according to further embodiments. It is assumed that steps S102, S104 are performed as described above with reference to FIG. 3 and a thus repeated description thereof is therefore omitted.

The channel conditions per antenna element could be used to determine precoding weights for data transmission and/or reception. In some aspects the channel conditions are thus used by the radio transceiver device 200 to determine beamforming weights for data transmission and/or reception. Particularly, according to an embodiment each of the N antenna elements 222 are controlled by beamforming weights and the radio transceiver device 200 is configured to perform (optional) step S106:

S106: The radio transceiver device 200 determines beamforming weights based on the channel conditions for the N antenna elements 222 to use for at least one of data transmission and reception.

The channel conditions for the N antenna elements 222 could, for example, be used to determine transmitter precoding weights if reciprocity holds. They can also be used for determining receiver combining weights. Particularly, according to an embodiment the beamforming weights define phase shift and/or amplitude tapering of the N antenna elements 222.

Figure 6:
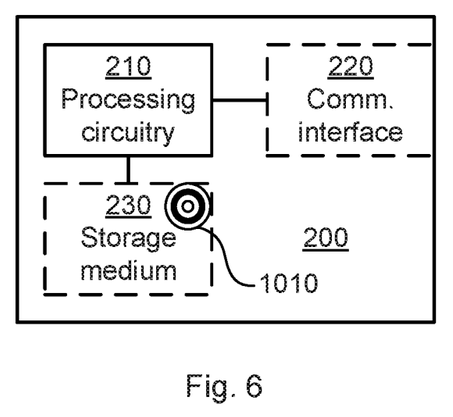
FIG. 6 is a schematic diagram showing functional units of a radio transceiver device according to an embodiment.

FIG. 6 schematically illustrates, in terms of a number of functional units, the components of a radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200 to perform a set of operations, or steps, S102-S106, as disclosed above. For example, the storage medium 230 may store the set of operations, and the processing circuitry 210 may be configured to retrieve the set of operations from the storage medium 230 to cause the radio transceiver device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200 may further comprise a communications interface 220 at least configured for communications with other entities, nodes, devices, and functions such as the access node 300a (and optionally the access node 300b) of the communications network 100 of FIG. 1. As such the communications interface 220 may comprise one or more transmitters and receivers, comprising analogue and digital components. The processing circuitry 210 controls the general operation of the radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200 are omitted in order not to obscure the concepts presented herein.

Figure 7:
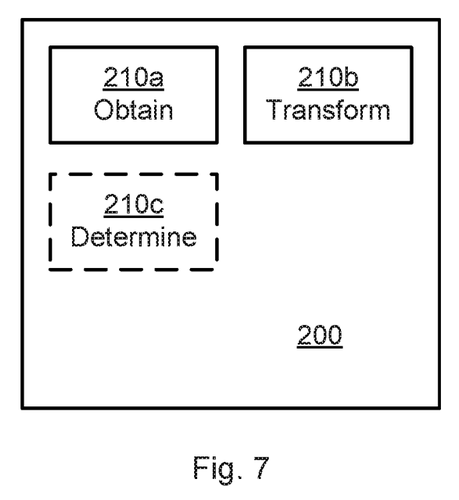
FIG. 7 is a schematic diagram showing functional modules of a radio transceiver device according to an embodiment.

FIG. 7 schematically illustrates, in terms of a number of functional modules, the components of a radio transceiver device 200 according to an embodiment. The radio transceiver device 200 of FIG. 7 comprises a number of functional modules; an obtain module 210a configured to perform step S102, and a transform module 210b configured to perform step S104. The radio transceiver device 200 of FIG. 7 may further comprise a number of optional functional modules, such a determine module 210c configured to perform step S106. In general terms, each functional module 210a-210c may in one embodiment be implemented only in hardware and in another embodiment with the help of software, i.e., the latter embodiment having computer program instructions stored on the storage medium 230 which when run on the processing circuitry makes the radio transceiver device 200 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210c may be implemented by the processing circuitry 210, possibly in cooperation with the communications interface 220 and/or the storage medium 230. The processing circuitry 210 may thus be configured to from the storage medium 230 fetch instructions as provided by a functional module 210a-

210c and to execute these instructions, thereby performing any steps as disclosed herein.

The radio transceiver device 200 may be provided as a standalone device or as a part of at least one further device. For example, the radio transceiver device 200 may be implemented in, part of, or co-located with, a radio access network node 800 (as in FIG. 8) or a terminal device 900 (as in FIG. 9). Hence, according to some aspects there is provided a radio access network node 800 and/or a terminal device 900 comprising a radio transceiver device 200 as herein disclosed.

Further, a first portion of the instructions performed by the radio transceiver device 200 may be executed in a first device, and a second portion of the of the instructions performed by the radio transceiver device 200 may be executed in a second device; the herein disclosed embodiments are not limited to any particular number of devices on which the instructions performed by the radio transceiver device 200 may be executed. Hence, the methods according to the herein disclosed embodiments are suitable to be performed by a radio transceiver device 200 residing in a cloud computational environment. Therefore, although a single processing circuitry 210 is illustrated in FIG. 6 the processing circuitry 210 may be distributed among a plurality of devices, or nodes. The same applies to the functional modules 210a-210c of FIG. 7 and the computer program 1020 of FIG. 10 (see below).

Figure 10:
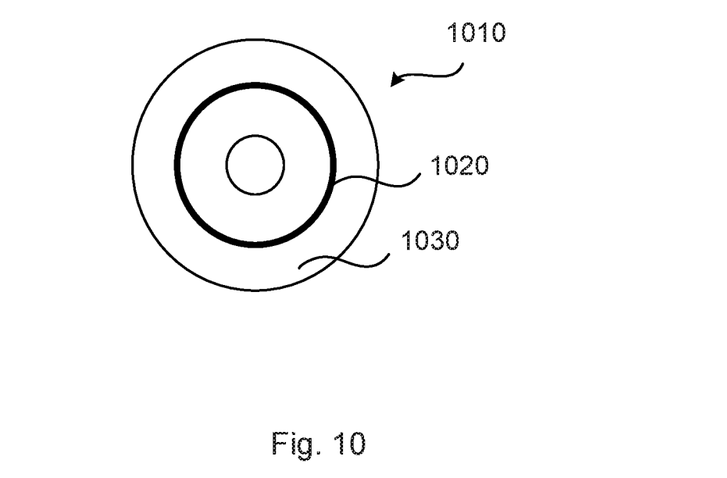
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A radio transceiver device for obtaining channel conditions per antenna element of an antenna array comprising N antenna elements and being configured for communications using orthogonal sub-carriers, the radio transceiver device comprising processing circuitry, the processing circuitry being configured to cause the radio transceiver device to:

obtain channel conditions of a radio propagation channel per sub-carrier for signals received on the sub-carriers by the antenna array, wherein a set of receiving entities are associated with the sub-carriers in an interleaved manner such that no sub-carriers that are associated with the same receiving entity are adjacent to each other; and transform the channel conditions at least for those sub-carriers located within a coherence bandwidth of the radio propagation channel to channel conditions for the N antenna elements by using a relation that maps the receiving entities to the N antenna elements.

2. The radio transceiver device of claim 1, wherein
the receiving entities only are associated with those of the sub-carriers that carry pilot signals, or
the receiving entities are interleaved over the sub-carriers such that all the receiving entities are associated with those sub-carriers located within the coherence bandwidth.

3. The radio transceiver device of claim 1, wherein
the channel conditions are interpolated between at least two of the sub-carriers in order to obtain channel conditions for all the sub-carriers, or
the channel conditions for the N antenna elements are channel conditions of the radio propagation channel.

4. The radio transceiver device of claim 1, wherein the radio transceiver device is an access node serving a radio transceiver device, and wherein the channel conditions are indicative of the signals as received from the served radio transceiver device as well as interfering signals received from at least one other radio transceiver device.

5. The radio transceiver device of claim 1, wherein the channel conditions for the N antenna elements are indicative of at least one of signal to interference plus noise ratio (SINR) of the received signals, and channel throughput of the radio propagation channel.

6. The radio transceiver device of claim 1, wherein
the channel conditions are representative of channel estimations as averaged over multiple time and/or frequency samples, or
the channel conditions of the radio propagation channel per sub-carrier are obtained at baseband.

7. The radio transceiver device of claim 1, wherein the channel conditions for the N antenna elements are obtained using a single orthogonal frequency-division multiplexing symbol.

8. The radio transceiver device of claim 1, wherein the channel conditions for the N antenna elements are obtained using at least two orthogonal frequency-division multiplexing (OFDM) symbols, where channel conditions for different receiving entities are obtained for each OFDM symbol.

9. The radio transceiver device of claim 1, wherein
each of the N antenna elements are controlled by beamforming weights,
the radio transceiver device is further adapted to determine precoding weights based on the channel conditions for the N antenna elements to use for at least one of data transmission and reception, and
the beamforming weights define phase shift and/or amplitude tapering of the N antenna elements.

10. The radio transceiver device of claim 1, wherein the receiving entities are beams generated by the antenna array.

11. The radio transceiver device of claim 10, wherein the beams are associated with the sub-carriers such that the channel conditions are obtained per beam.

12. The radio transceiver device of claim 10, wherein the beams are generated by digital beamforming of the antenna array.

13. The radio transceiver device of claim 12, wherein the N antenna elements are represented in antenna space and the beams are represented in beam space, wherein the digital beamforming comprises using a transform from the antenna space to the beams space, and wherein the relation that maps the receiving entities to the N antenna elements is an inverse of said transform.

14. The radio transceiver device of claim 13, wherein the transform represents beamforming weights, and wherein the transform is a full-rank transformation.

15. The radio transceiver device of claim 13, wherein the transform represents beamforming weights, and wherein said inverse of said transform is a pseudo-inverse of the beamforming weights.

16. The radio transceiver device of claim 10, wherein the digital beamforming is frequency-selective.

17. The radio transceiver device of claim 1, wherein
the receiving entities are the antenna elements,
the relation that maps the receiving entities to the N antenna elements is a selection matrix comprising selection vectors, and wherein each selection vector maps a single antenna element to each of the sub-carriers, and
the selection matrix is a block-diagonal matrix.

18. The radio transceiver device of claim 1, wherein
the set of receiving entities includes a first receiving entity, a second receiving entity, and a third receiving entity,
a first sub-carrier is associated with the first receiving entity,
a second sub-carrier adjacent to the first sub-carrier is associated with the second receiving entity,
a third sub-carrier adjacent to the second sub-carrier is associated with the first receiving entity or the third receiving entity, and
the third sub-carrier is not adjacent to the first sub-carrier.

19. A method for obtaining channel conditions per antenna element of an antenna array comprising N antenna elements and being configured for communications using orthogonal sub-carriers, the method being performed by a radio transceiver device, the method comprising:
obtaining channel conditions of a radio propagation channel per sub-carrier for signals received on the sub-carriers by the antenna array, wherein a set of receiving entities are associated with the sub-carriers in an interleaved manner such that no sub-carriers that are associated with the same receiving entity are adjacent to each other; and
transforming the channel conditions at least for those sub-carriers located within a coherence bandwidth of the radio propagation channel to channel conditions for the N antenna elements by using a relation that maps the receiving entities to the N antenna elements.

20. A computer program product comprising a non-transitory computer readable medium storing a computer program for obtaining channel conditions per antenna element of an antenna array comprising N antenna elements and being configured for communications using orthogonal sub-carriers, the computer program comprising computer code which, when run on processing circuitry of a radio transceiver device, causes the radio transceiver device to:
obtain channel conditions of a radio propagation channel per sub-carrier for signals received on the sub-carriers by the antenna array, wherein a set of receiving entities are associated with the sub-carriers in an interleaved manner such that no sub-carriers that are associated with the same receiving entity are adjacent to each other; and
transform the channel conditions at least for those sub-carriers located within a coherence bandwidth of the radio propagation channel to channel conditions for the N antenna elements by using a relation that maps the receiving entities to the N antenna elements.

* * * * *